United States Patent
Jacobson

[15] 3,635,109
[45] Jan. 18, 1972

[54] MACHINE TOOL
[72] Inventors: Alden H. Jacobson, Princeton, Mass.
[73] Assignee: The Heald Machine Company, Worcester, Mass.
[22] Filed: June 29, 1970
[21] Appl. No.: 56,091

Related U.S. Application Data
[63] Continuation of Ser. No. 710,389, Apr. 4, 1968, abandoned.

[52] U.S. Cl. ..........................................82/2 D, 82/3, 82/19
[51] Int. Cl. ...........................................................B23b 3/06
[58] Field of Search..........................................82/3, 2 D, 19

[56] References Cited

UNITED STATES PATENTS

| | | | |
|---|---|---|---|
| 1,056,332 | 3/1913 | Hartness | 82/3 X |
| 1,858,754 | 5/1932 | Tessky | 82/19 X |
| 1,940,404 | 12/1933 | Dumser | 82/2 D |
| 2,372,692 | 4/1945 | Svenson | 82/21 A |
| 2,389,019 | 11/1945 | Bazley et al. | 82/2 D |
| 3,200,671 | 8/1965 | Porath | 82/31 X |
| 3,203,316 | 8/1965 | Cashman et al. | 82/3 X |

*Primary Examiner*—Leonidas Vlachos
*Attorney*—Norman S. Blodgett

[57] ABSTRACT

This invention relates to a machine tool and, more particularly, to apparatus having a workhead operative for rotation and a tool carrying column which is slidable along and rotatable about an axis spaced from and parallel to the axis of the workhead.

13 Claims, 4 Drawing Figures

PATENTED JAN 18 1972

ALDEN H. JACOBSON
INVENTOR.

BY Warren S. Blodgett

MACHINE TOOL

This is a continuation of application Ser. No. 710,389 filed Mar. 4, 1968 and now abandoned.

BACKGROUND OF THE INVENTION

One of the difficulties experienced in the design of machine tools is that they usually have required a very large base and are complicated and expensive. Furthermore, they are usually so high in the vertical direction that it is difficult to find an operator who can operate them conveniently. Furthermore, it is difficult, particularly in the case of conventional boring machines, to introduce heavy workpieces into the work area. At the same time, it has always been difficult to obtain rigidity of the machine between the tool-carrying portion and the work-carrying portion, especially in those cases where the workpiece is rotated and the tool is introduced to the workpiece to generate a surface of revolution. These and other difficulties experienced with the prior art devices have been obviated in a novel manner by the present invention.

It is, therefore, an outstanding object of the invention to provide a machine tool capable of extreme rigidity between the workhead and the tool carrying portion.

Another object of this invention is the provision of a machine tool to which heavy workpieces may be introduced by use of an overhead crane.

A further object of the present invention is the provision of a machine tool for producing a surface of revolution in which the operative mechanism is relatively simple and uncomplicated and which is capable of a long life of useful service with a minimum of maintenance.

It is another object of the instant invention to provide a machine tool in which the work area is located in a horizontal plane that is low enough so that the operator can bend over the work area very readily.

A still further object of the invention is the provision of a machine tool for boring which is relatively inexpensive to manufacture.

It is a further object of the invention to provide a machine tool in which motion between the workpiece and the tool takes place without the use of expensive straight ways which are difficult to manufacture and difficult to maintain properly.

With these and other objects in view, as will be apparent to those skilled in the art, the invention resides in the combination of parts set forth in the specification and covered by the claims appended hereto.

SUMMARY OF THE INVENTION

In general, this invention has to do with a machine tool having a surface on which appears a workhead mounted for rotation about an axis perpendicular to the surface. Substantially spaced from the workhead is a tool support in the form of a large cylindrical column. This column is slidable and rotatable, the rotation taking place about an axis parallel to the axis of rotation of the workhead. A motor operates through a transmission to operate a cam which produces the sliding motion of the tool support and to operate another cam which operates the rotative motion of the column to present a tool in a suitable predetermined manner to the workpiece to produce a surface of revolution.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
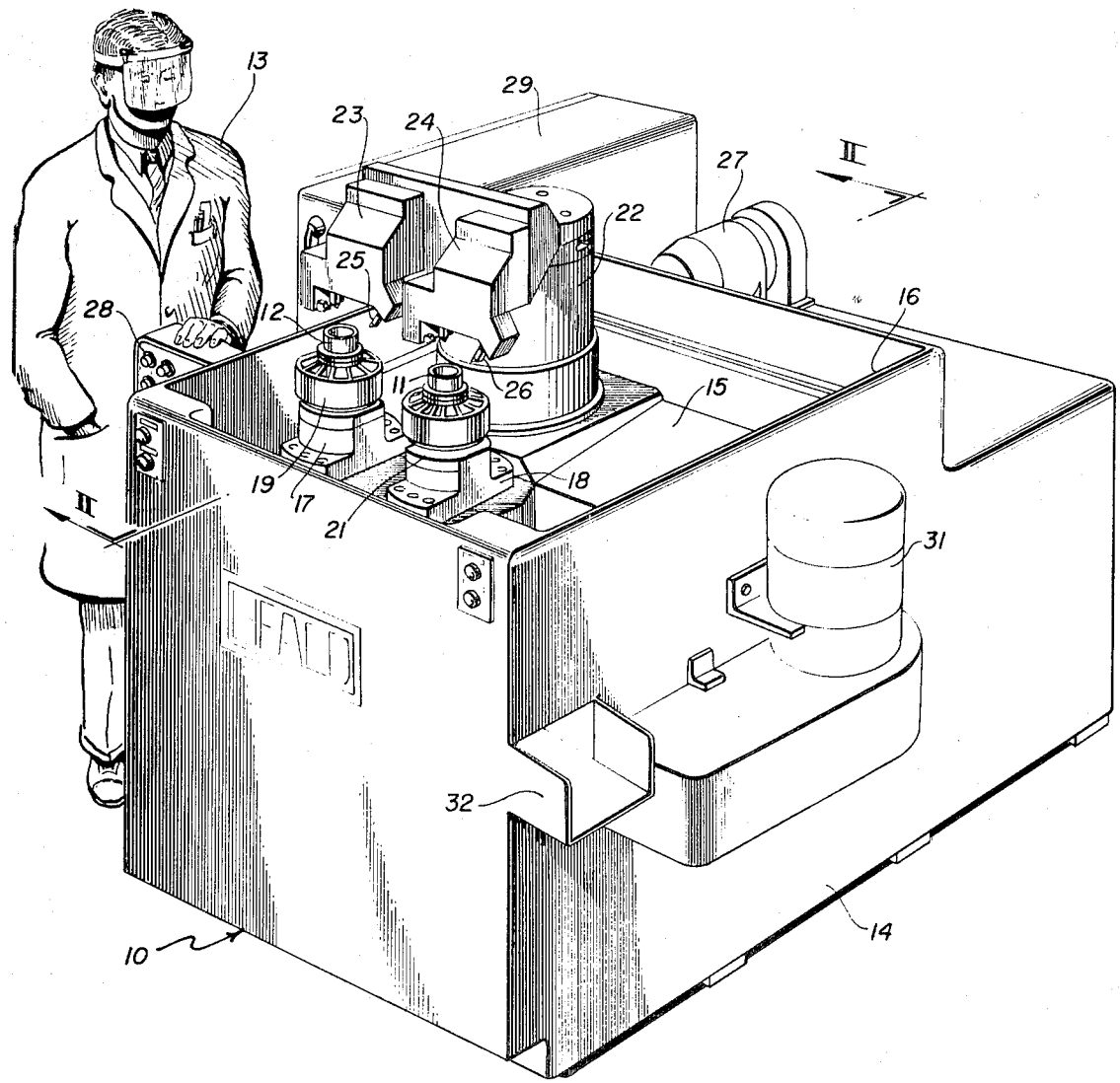
FIG. 1 is a perspective view of a machine tool embodying the principles of the present invention.

Referring first to FIG. 1, which best shows the general features of the invention, the machine tool, indicated generally by the reference numeral 10, is shown in use in finishing surfaces of revolution on workpieces 11 and 12 and the operation is being observed by an operator 13. The machine tool is provided with a base 14 adapted to rest on the floor and having a generally horizontal deck or upper surface 15 which is enclosed in a vertical wall 16. Extending upwardly from the upper surface 15 are two workheads 17 and 18 carrying chucks 19 and 21, respectively, for rotation about vertical axes. The chuck 19 carries the workpiece 12, while the chuck 21 carries the workpiece 11 for rotation about the axis of the surface of revolution which it is desired to finish.

Extending upwardly from the deck or upper surface 15 is a tool support 22 in the form of a large cylindrical column. Attached to the upper end of the column are tool holders 23 and 24 carrying, respectively, cutting tools 25 and 26 which, for the purpose of illustration, are shown as single-point tools. Mounted on the machine on the general level of the upper surface 15 but exteriorly of the wall 16 is an electric motor 27. An electrical control box 28 is located next to the operator 13, while a hydraulic unit 29 is mounted to one side of the machine and carries the usual pumps and reservoirs associated with the hydraulic supply of a machine tool. Mounted on the side of the machine is a motor 31 which is mounted with its axis vertical for driving the spindles associated with the workheads 17 and 18. Extending from the side of the machine is a chute 32 which, as will be shown hereinafter, receives coolant and chips resulting from the machining operations taking place above the upper surface 15.

Figure 2:
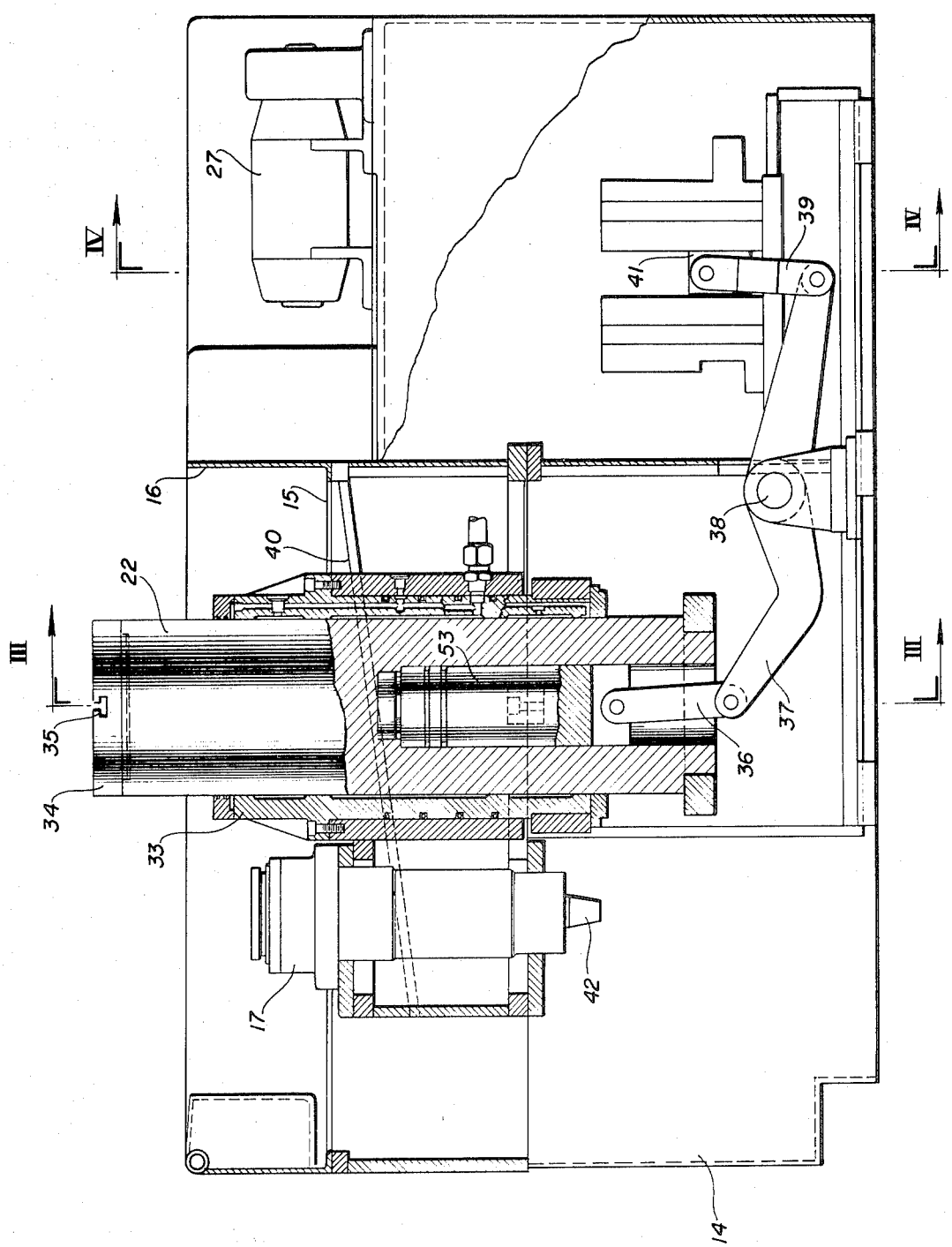
FIG. 2 is a vertical sectional view of the machine tool taken on the line II—II of FIG. 1.

Referring to FIG. 2, it can be seen the tool support 22 is mounted in a fixed hydrostatic bearing sleeve 33 which holds the cylindrical column firmly against angular movement about a horizontal axis but which permits vertical movement along the axis of the cylinder and rotative movement about that same axis. The upper end of the tool support is provided with a cap 34 having a Tee slot 35 which is used for the attachment of the tool holders 23 and 24. The bottom end of the tool support is connected through a link 36 to one end of a generally horizontal lever 37 mounted in its central portion in a journal 38 having a horizontal axis, the other end of the lever being attached through a link 39 to a slide 41.

This figure shows clearly the manner in which the workhead 17 is mounted vertically in the base 14, extends well above the upper deck or surface 15. The workhead is clearly provided with a vertical spindle 42 which is connected by vee belts (not shown) to the output shaft of the spindle motor 31, those same belts operating a similar spindle on the workhead 18. This view shows particularly well the manner in which the upper deck 15 is provided with an inclined surface 43 which slants downwardly to join the chute 32 for the accumulation and removal of chips and cooling fluid.

Figure 3:
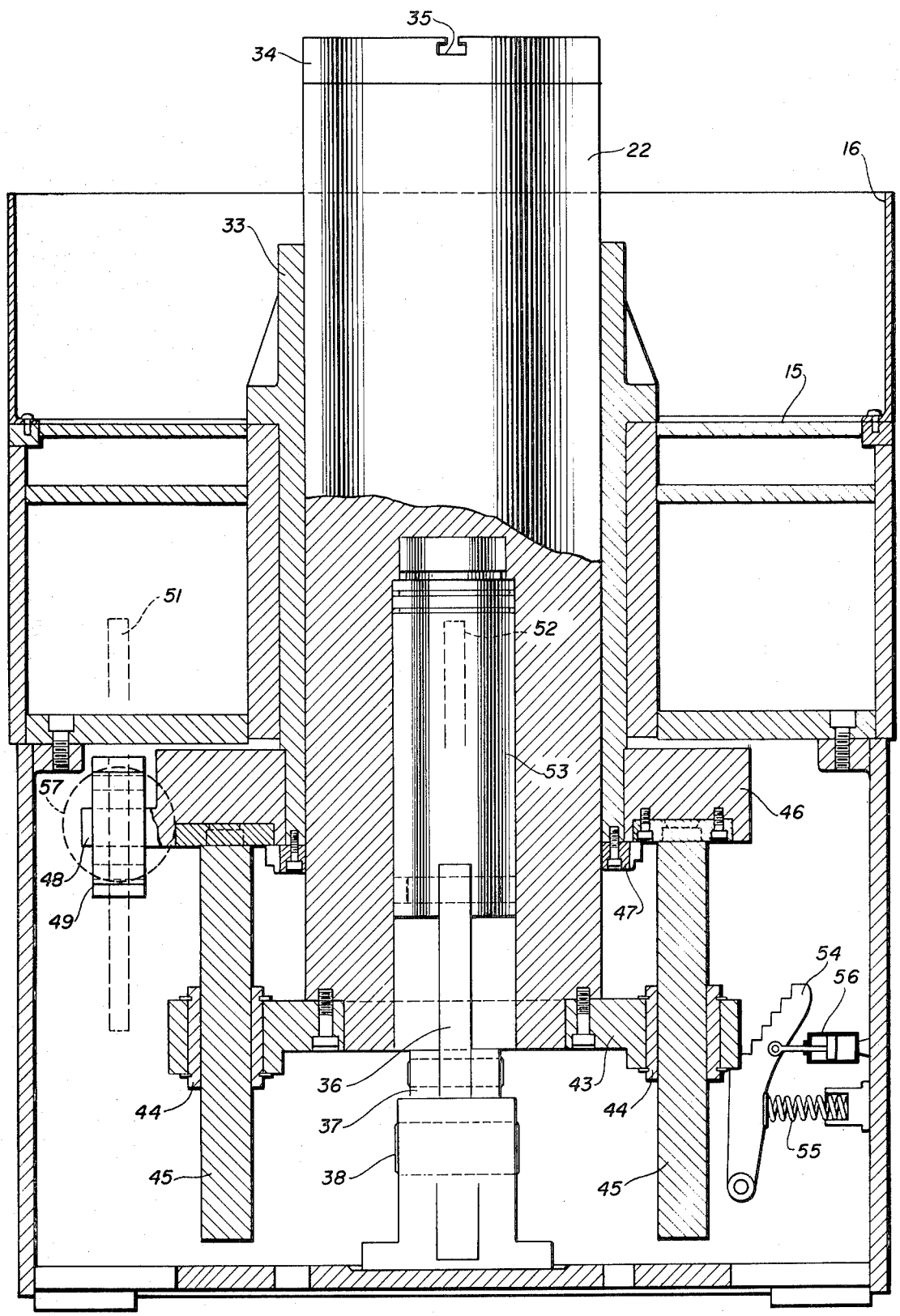
FIG. 3 is a vertical sectional view of the apparatus taken on the line III—III of FIG. 2.

FIG. 3 shows the manner in which the tool support 22 is supported for vertical movement and for rotation about the axis of the cylinder. At the lower end, it is provided with a spider 43 having bushings 44 which slide freely over dependent vertical posts 45. These posts are suspended from a ring 46 which is mounted for rotation on the outside of the fixed bushing 33 in which the column is vertically slidable. The spider 43 rests on a ring 47 which is bolted to the bottom of the bushing 33 and extends outwardly therefrom in the manner of a flange or shoulder.

The ring 46 is provided with an outwardly extending finger 48 on which is mounted a connector 49 which, in turn, is actuated for the rotation of the ring 46 by means of a cam 51 shown in dotted form in the background. This figure also shows in dotted form the cam 52 which operates through the lever 37 to produce vertical movement of the tool support 22. It should be noted that the link 36 is connected to the lower end of a piston 53 slidable in a suitable vertical bore at the bottom end of the tool support 22. This is for providing for extended travel of the column upwardly beyond what would normally be given it by the cam 52.

Operative on the spider 43 is a step latch 54 which is pivotally mounted on the base normally pressed toward the spider 43 by a coil spring 55. It can be drawn away from the spider by a pneumatic cylinder 56. Fastened on the forward end of the connector 49 is an air cylinder 57 which normally pushes the connector 49 (or cam follower) toward the cam 51 to keep it in constant contact therewith. It is this piston under continuous air pressure which returns the tool support 22 back to its original position of rotation after a work cycle has been completed. The same cylinder may be used on occasion for extended travel of the column from its normal extreme position of rotation as would be brought about by the highest point on the cam 51.

Figure 4:
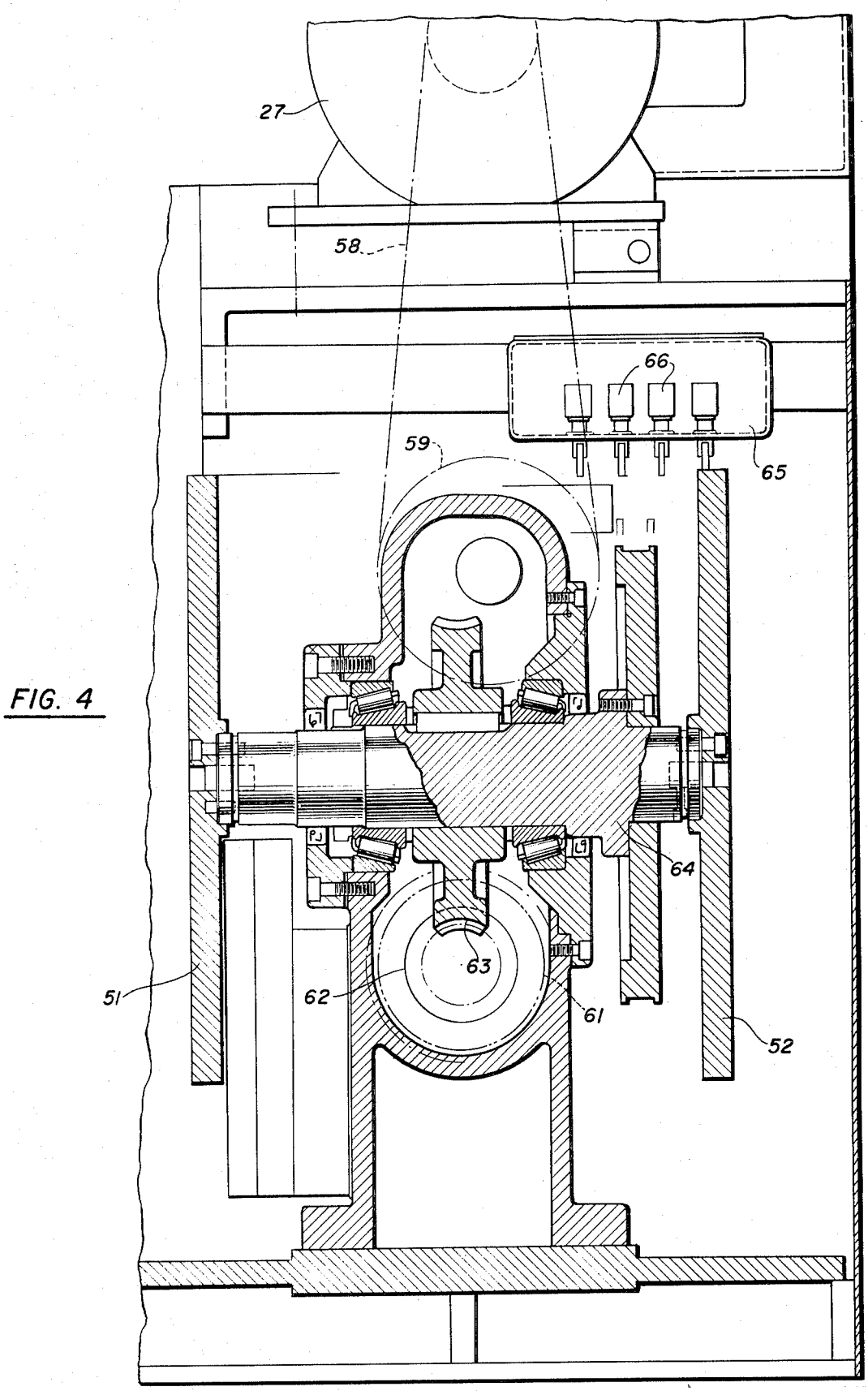
FIG. 4 is a vertical view of the invention taken on the lines IV—IV of FIG. 3.

Referring now to FIG. 4, it can be seen that the cam motor 27 operates through a belt 58 to operate a pulley 59 which, in turn, is connected to a pulley 61 which is keyed to a horizontal worm 62. This worm engages and rotates a worm gear 63 which is keyed to a horizontal camshaft 64 carrying at opposite ends the cams 51 and 52. A control box 65 carries a series of limit switches 66 which engage various parts of the cams and their operative mechanism to stop cam motion during portions of the cycle and to limit the motions of the cams from time to time.

The operation of the apparatus will now be readily understood in view of the above discussion. During the time when the operator is loading the workpieces 11 and 12 on the workheads 17 and 18 the column or tool support 22 would be raised vertically and rotated so that the tool holders 23 and 24 with their tools 25 and 26 would be rotated well away from the workhead area. Once the workpieces have been locked in the chucks 19 and 21 the motor 27 is energized and it operates through the worm 62 and the worm gear 63 to move the cams 51 and 52. The cam 51 operates through the cam follower or connector 49 to rotate the ring 46 and, therefore, to rotate the tool support 22. This brings the tools 25 and 26 into a preset position relative to the axes of the surface of revolution of the workpiece which is to be finished. In the generation of a cylinder, for instance, it would be the usual practice rotate the work support 22 to an angle where the distance from the axis of the workhead and of the workpiece to the point of the tool is equal to the desired radius of the cylinder. Then, the angularity of the column is locked in that position and the column is moved vertically only to introduce the tool to the workpiece and to generate the cylindrical surface. After the machining operation is over, it is a simple matter to swing the column in the opposite direction to move the tool away from the workpiece and then to swing the tool holder and tool even further angularly to remove it from a position overlying the workhead so that workpieces can be changed. When it is necessary to change tool holders and tools, the cylinder 53 can be energized to produce an even longer longitudinal rise of the column out of the base 14 and then produce an extraordinary angular motion by use of the cylinder 57 the column is raised to a very high-vertical position and is rotated toward the outside of the machine tool where the operator can have access to the top of the column for changing the tool holders. The usual hydraulic fluid is supplied under pressure to the hydrostatic pockets formed on the inside of the bushing 33 so that the cylindrical work support 22 is mounted in a long hydrostatic bearing which gives it extraordinary stiffness lending extreme accuracy to the machining operations despite machine forces which would tend to bend the column. The column is extraordinarily large in diameter to prevent such bending and the bearing in which it is carried is in the manner described made very stiff so that these forces do not make themselves felt as a deflection of the tool away from the desired surface of revolution to be machined. At the same time, in the manufacture of the machine, it can be seen that there is no need for the straight ways that are conventionally used in such machine tools. Actually, it is a very simple procedure to generate a very accurate cylinder for the tool support 22 and to provide the internal cylindrical surfaces in the bushing 33 to a very accurate degree so that the guiding is accomplished to a high degree of accuracy at relatively low-manufacturing cost. The same benefit appears again when one is concerned with the maintenance of the machine tool. There are no straight ways to be bent, knocked, scratched, or otherwise placed in a condition where they fail to guide the tool holder in a straight geometric line. At the same time, it is a very simple matter to change the nature of the machining cycle by replacing the cams 51 and 52 with cams which are formed to take care of the new cycle. The wall 16 forms a protective shield around the work area and causes cooling fluid and chips to fall down into the trough 40 and out through the chute 32. It is clear that there is no large vertical column which is normally to be found in machine tools of this type, so that the machine has a low silhouette which makes it possible to use overhead cranes and similar handling equipment to introduce heavy workpieces onto the workhead for machining. The advantage of the low silhouette, so far as producing aesthetic layouts of machines in a machine shop is well known; for one thing, it permits the operator to see over the tops of the machines and gives the impression of uncrowdedness to a machine shop where machines of this type are used.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool comprising,
   a. a base,
   b. two workheads mounted for rotation about spaced, parallel vertical axes,
   c. a tool support consisting of a vertical column arranged for vertical movement and for rotation to introduce a tool vertically and horizontally to a workpiece mounted on each workhead, the tool support being in the form of a cylindrical column of circular cross section of relatively large diameter,
   d. a hydrostatic bearing mounted in the base in which the post is slidably and rotatably carried,
   e. a first cam mounted in the housing for producing the vertical movement of the tool support, and
   f. a second cam mounted in the housing for producing the rotational movement of the tool support.

2. A machine tool as recited in claim 1, wherein a tool is mounted on the upper end of the column and directed in the downward direction so that downward vertical movement of the tool support produces downward movement of the tool in the neighborhood of the workhead.

3. A machine tool as recited in claim 1, wherein a tool is mounted at the upper end of the tool support and is directed downwardly so that rotation of the tool support produces radial movement of the tool relative to the axis of the workhead and to the axis of rotation of the workpiece.

4. A machine tool as recited in claim 1, wherein a drive motor operates through a transmission train to rotate the first cam for producing vertical movement of the tool support and wherein the same motor operates through the same transmission train to produce rotation of the second cam which, in turn, causes rotative movement of the tool support.

5. A machine tool as recited in claim 1, wherein the tool support has a laterally directed arm on which are mounted a plurality of tools which are successively brought into cutting engagement with a workpiece.

6. A machine tool as recited in claim 1, wherein the lower end of the cylindrical column is provided with an outwardly extending spider having a plurality of bores, and wherein a ring is mounted concentrically with the cylindrical column for rotation by the second cam and has a plurality of axially extending posts which extend slidably through the bores in the spider.

7. A machine tool as recited in claim 6, wherein a step latch is mounted on the base for selective engagement with the spider.

8. A machine tool as recited in claim 7 wherein a pneumatic cylinder continuously biases the ring toward engagement by the second cam.

9. A machine tool as recited in claim 1, wherein a pneumatic cylinder is mounted coaxially of the cylindrical column to permit selection of the range of travel due to the first cam.

10. A machine tool comprising
 a. a base,
 b. a workhead mounted for rotation about a vertical axis,
 c. a tool support consisting of a vertical column arranged for vertical movement and for rotation to introduce a tool vertically and horizontally to a workpiece mounted on the workhead, the tool support being in the form of a cylindrical column of circular cross section of relatively large diameter, the lower end of the cylindrical column being provided with an outwardly extending spider having a plurality of bores,
 d. a hydrostatic bearing mounted in the base in which the post is slidably and rotatably carried,
 e. a first cam mounted in the housing for producing the vertical movement of the tool support
 f. a second cam mounted in the housing for producing the rotational movement of the tool support, and
 g. a ring mounted concentrically with the cylindrical column for rotation by the second cam, the ring having a plurality of axially extending posts which extend slidably through the bores in the spider.

11. A machine tool as recited in claim 10, wherein a step latch is mounted on the base for selective engagement with the spider.

12. A machine tool as recited in claim 10, wherein a pneumatic cylinder continuously biases the ring toward engagement by the second cam.

13. A machine tool comprising
 a. a base,
 b. a workhead mounted for rotation about a vertical axis,
 c. a tool support consisting of a vertical column arranged for vertical movement and for rotation to introduce a tool vertically and horizontally to a workpiece mounted on the workhead, the tool support being in the form of a cylindrical column of circular cross section of relatively large diameter,
 d. a hydrostatic bearing mounted in the base in which the post is slidably and rotatably carried,
 e. a first cam mounted in the housing for producing the vertical movement of the tool support,
 f. a second cam mounted in the housing for producing the rotational movement of the tool support, and
 g. a pneumatic cylinder is mounted coaxially of the cylindrical column to permit selection of the range of travel due to the first cam.

* * * * *